United States Patent [19]

Colak et al.

[11] Patent Number: 5,002,360

[45] Date of Patent: Mar. 26, 1991

[54] FREQUENCY DOUBLING OPTICAL WAVEGUIDE WITH ACTIVE PHASE MATCHING

[75] Inventors: Sel B. Colak, Ossining; Efim Goldburt, Briarcliff Manor, both of N.Y.

[73] Assignee: North American Philips Corp., New York, N.Y.

[21] Appl. No.: 453,541

[22] Filed: Dec. 20, 1989

[51] Int. Cl.$^5$ .............................. G02B 6/02; G02B 6/16
[52] U.S. Cl. .................................... 350/96.29; 357/24; 357/30
[58] Field of Search .............. 350/96.12, 96.13, 96.14, 350/96.29; 357/24 LR, 30 L

[56] References Cited

U.S. PATENT DOCUMENTS 4,857,978 8/1989 Goldburt et al. .............. 357/24 LR

Primary Examiner—William L. Sikes
Assistant Examiner—Robert E. Wise
Attorney, Agent, or Firm—William L. Botjer

[57] ABSTRACT

An actively phase matched waveguide structure suitable for use as a frequency doubling device is described. The device includes a non-linear optical waveguide and phase matching of the waveguide is controlled by an electrically operated light modulator which is spaced apart from the waveguide. The modulator includes one or more electrodes disposed on a substrate and an elastomeric transparent gel which has a metallic coating on its upper surface. Application of a voltage between the metallic upper surface and the electrodes causes a deformation in the gel which alters the gap between the upper surface of gel and thus provides phase matching.

4 Claims, 1 Drawing Sheet

FREQUENCY DOUBLING OPTICAL WAVEGUIDE WITH ACTIVE PHASE MATCHING

BACKGROUND OF THE INVENTION

This invention relates to nonlinear optical devices and more particularly to devices for doubling the frequency of electromagnetic radiation passing therethrough.

Optical digital data storage devices, such as compact discs, have recently come into common usage. Typically, such discs are read and written to by means of a light emitted by a semiconductor laser (i.e. a laser diode). However, the light generated by semiconductor laser diodes generally falls within the lower end of the electromagnetic frequency spectrum (i.e. red or infrared). The use of higher frequency light, i.e. at the blue end of the spectrum, to read and write to optical storage medium would result in greatly increased storage density. Unfortunately, however, there are yet no practical blue semiconductor lasers. To date, the only blue lasers are large gas lasers which are obviously unsuitable for use in compact and inexpensive optical storage read-/write devices.

Accordingly, a device capable of converting the light emitted by readily available semiconductor laser diodes to blue light is greatly desired. Laser diodes that emit infrared light are inexpensive and widely available. The frequency of blue light is twice that of infrared radiation. Accordingly, a device capable of doubling the frequency of infrared radiation has considerable commercial potential. The present invention is directed to providing an inexpensive frequency doubling device that may be used in conjunction with an infrared semiconductor laser to provide blue light suitable for use in reading and writing optical storage media.

The field of the non-linear optics has provided a number of devices used as frequency doublers, generally through the means of second harmonic generation (SHG) of a fundamental frequency. Such devices include bulk materials and stacks of non-linear crystals. A particularly effective doubling device is a non-linear optical waveguide. As a light beam passes through the waveguide the non-linear optical effect causes the generation of a lightwave of the second harmonic of the input lightwave. Such optical waveguides can be quite efficient in providing frequency doubling.

However, efficient frequency doubling requires accurate phase matching between the fundamental and harmonic waves. If the frequency doubling device is not properly phase matched interference effects will cause attenuation of the second harmonic. In a waveguide the tolerance requirements for accurate phase matching between the geometrical and physical properties of the waveguide are very difficult to achieve. A number of different structures have been proposed to provide phase matching. Phase matching has been attempted by both passive and active means. Passive phase matching has been accomplished by, for example, the addition of a periodic structure to a frequency doubling device. However, such devices are incapable of responding to changeable conditions and may lose accuracy over time. In contrast, the parameters of an active structure can be controlled in response to the measured output of the doubled light. Accordingly, it is desirable to be able to control the phase matching properties in an active manner. However, active phase matching devices have either been impractical or incapable of controlling the phase matching to a sufficient degree.

Other methods for the active phase matching of waveguide type frequency doubling devices may be found in applications of which one of the inventors herein is a co-inventor. These applications are entitled "Actively Phased Matched Frequency Doubling Optical Waveguide", Ser. No. 448,032 filed Dec. 8, 1989 and "Gap Tuned Optical Waveguide Device", Ser. No. 445,075 filed Nov. 30, 1989 and now U.S. Pat. No. 4,974,923. The disclosure of these two applications is hereby incorporated by reference as if fully set forth herein.

SUMMARY OF THE INVENTION

The present invention is directed to providing an inexpensive device and methodology for doubling the frequency of electromagnetic radiation. Specifically, the structure utilizes active control of phase matching in the frequency doubling waveguide by the application of an electrical signal across a light modulating device comprising a transparent elastomeric gel which is disposed between one or more electrodes and a metallic layer. Upon application of a voltage between the metallic upper surface and the electrodes the elastomeric gel is deformed, modulating the gap between the light modulator and the waveguide and controlling the phase matching through the device as a whole.

The methodology and materials for constructing a light modulator suitable for tuning the flat non-linear optical waveguide may be found in U.S. Pat. No. 4,857,978 entitled "Solid-State Light Modulator Incorporating Metallized Gel and Method of Metallization" issued Aug. 15, 1989 and U.S. patent application "Method for Metallizing Silica-Containing Gel and Solid-State Light Modulator Incorporating the Metallized Gel" Ser. No. 292,632, filed Oct. 28, 1988. The disclosure of this patent and this application are hereby incorporated by reference, as if fully set forth herein.

As is apparent, a frequency doubling device constructed in accordance with the present invention is advantageous in that it is relatively easy to manufacture because the waveguide and light modulator structure are not complex. Furthermore, since the phase matching is active the waveguide will frequency double over a wide range of environmental conditions and may be readily automatically adjusted. Finally, since the device may be phase matched after manufacture, wider manufacturing tolerances may be utilized.

BRIEF DESCRIPTION OF THE DRAWINGS

For a better understanding of the invention reference is made to the following drawings, to be taken in conjunction with the detailed specification to follow:

FIG. 2 is a sectional view of the waveguide structure with the voltage to the electrodes turned on.

DETAILED DESCRIPTION OF THE PREFERRED EMBODIMENTS

Figure 1:
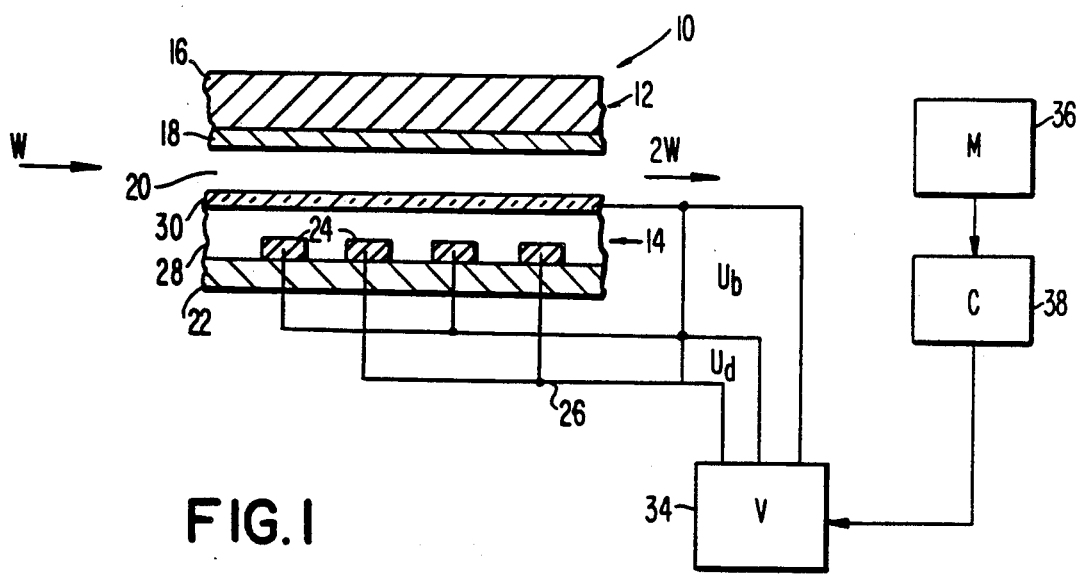
FIG. 1 is a sectional view of the waveguide structure with the voltage to the electrodes turned off.
Figure 2:
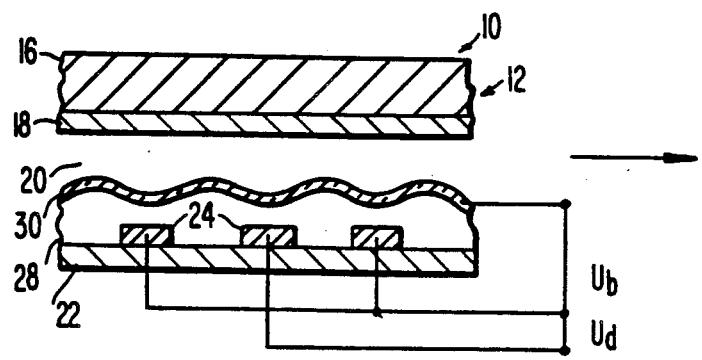

FIGS. 1 and 2 illustrates the inventive tunable optical waveguide 10 with FIG. 1 illustrating the light modulator unactivated and in FIG. 2 with the light modulator portion activated. The tunable optical waveguide consists of a waveguide portion 12 and a light modulator 14. Waveguide portion 12 comprises a flat slab of non-linear optical material 16 such as by way of example only, potassium titanate phosphate (KTiOPO$_4$) known as "KTP". Disposed on layer 16 is a second layer 18 which has a higher index of refraction than does layer 16 thus forming a non-linear optical waveguide capable of second harmonic generation. Second layer 18 may be formed by many well known techniques such as thallium diffusion into layer 16 or by the joining of two separate layers of non-linear optical materials having differing indexes of refraction.

The light modulator portion 14 of tunable waveguide assembly 10 is disposed with respect to waveguide portion 12 so that a gap 20 is disposed therebetween. Gap 20 is varied by action of light modulator 14 to thereby tune (phase match) the light passing through the overall assembly 10. Light modulator portion 14 includes a substrate 22, which may be such as silicon on which there are disposed at least one electrode 24, or a series of electrode 24 which are connected to wires 26 for electrical activation. Disposed over the electrodes 24 is a deformable transparent elastomer layer 28 on which is disposed a light reflecting metallic layer 30. Layer 30 can also be a transparent conductive coating.

Light modulator portion 14 is constructed in accordance with the teachings of U.S. Pat. No. 4,857,978 and/or application Ser. No. 292,632. Briefly summarized, the deformable transparent layer 28 comprises a silicon and oxygen containing gel such as polydimethyl siloxane (PDMS) whose upper surface is treated so as to readily adhere to metallic layer 30 which may be of aluminum, silver or indium. When a DC voltage differential is applied between electrodes 24 and metallic layer 30, electrostatic attraction therebetween causes the upper surface of modulator 14 to become deformed, as shown in FIG. 2. This deformation modulates gap 20 between the modulator portion 14 and waveguide portion 12. Since the light propagation through waveguide 10 is a function of the propagation through waveguide portion 12, modulator 14 and air gap 20 the modulation of air gap 20 is used to provide the phase matching of the entire device. When the driving voltage is switched off, the gel layer 28 returns the device to its initial geometry and the initial thickness of gap 20. The thickness of gap 20 is on the order of a fraction of 1 $\mu$m.

The amount of deformation of gel layer 28 is controlled by the magnitude of the voltage which is supplied by a voltage source 35 and applied across electrodes 24 and metallic layer 30. The voltage may be applied in the form of a single driving voltage $U_d$ or by the combination of a driving voltage $U_d$ and a bias voltage $U_b$. The bias voltage $U_b$ is present at all times and provides gel layer 28 with a constant deformation. Thereafter, smaller changes in deformation may be made by varying driving voltage $U_d$ in order to provide phase matching of device 10. By way of example, the thickness of gel layer 28 is 10–20 $\mu$m with a metallic layer 30 of approximately 0.1–0.2 $\mu$m. Using driving by Ud and Ub deformities of approximately 0.1–0.2 $\mu$m were achieved with a response time on the order of milliseconds.

Since the phase matching is adjusted by electrical means, automatic phase matching can be provided by means of a control input to voltage source 34 which is connected to control circuitry 38 which in turn has a control input connected to a light detector 36 for detecting the intensity of the output light, i.e. the second harmonic of the input light. Depending on the intensity of the output light, device 36 causes control circuit 38 to correct the output voltage of voltage supplier 34 thus insuring phase matching. The control circuitry need not be complex as the maximum intensity of the output light indicates a phase matched condition. The actual circuitry used in voltage source 30, control circuitry 32 and light detector 36 are well known to those skilled in the art and need not be described further.

The materials used in describing the structure set forth above are not to be construed as limiting but merely exemplary. For example, the waveguide could be constructed of a variety of materials such as lithium niobiate (LiNbO$_3$) or other material capable of forming a non-linear frequency doubling waveguide. Additionally elastomeric gels other than PDMS may also be used. It is also noted that this device can be used for mode to mode coupling between two or more waveguides.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A tunable optical waveguide comprising:
   a waveguide having first and second layers of non-linear optical material, said first and second layers having differing indexes of refraction;
   a light modulator disposed proximate to but spaced apart from said waveguide to define a gap therebetween, said light modulator including a substrate, at least one electrode disposed on said substrate; a deformable transparent gel layer disposed on said substrate and a layer of metal disposed on said gel layer; and
   means for providing a voltage differential between said electrode and said metallic layer so as to cause said gel layer to be deformed to alter said gap between said metal layer and said waveguide to thereby phase match said waveguide.

2. The tunable waveguide structure as claimed in claim 1 wherein said waveguide comprises KTP.

3. The tunable waveguide structure as claimed in claim 1 further including a control circuit for controlling a said means for providing a voltage differential.

4. The tunable waveguide as claimed in claim 3 further including a light measuring device for measuring the output of the light from said waveguide, said light measuring device having an output connected to a control input of said control circuitry for controlling the voltage applied between said electrodes and said metallic layer.

* * * * *